April 10, 1951 B. P. BAKER 2,548,462
PLANT CONTROL FOR HYDROELECTRIC GENERATORS
Filed June 12, 1946 3 Sheets-Sheet 3
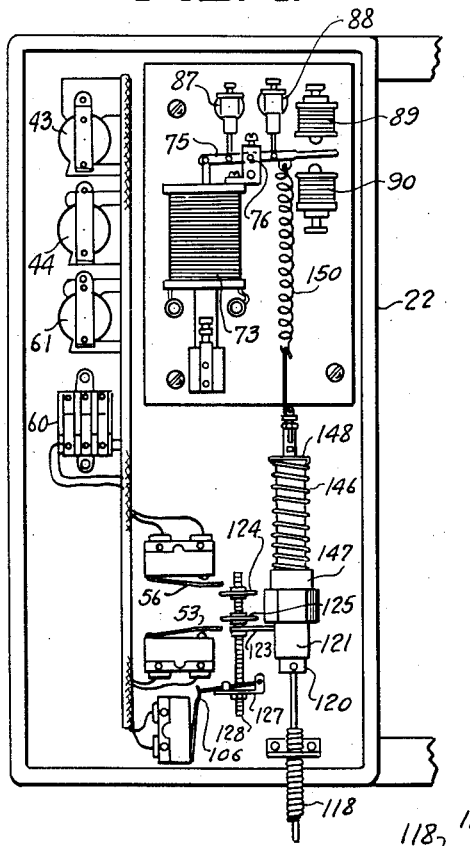
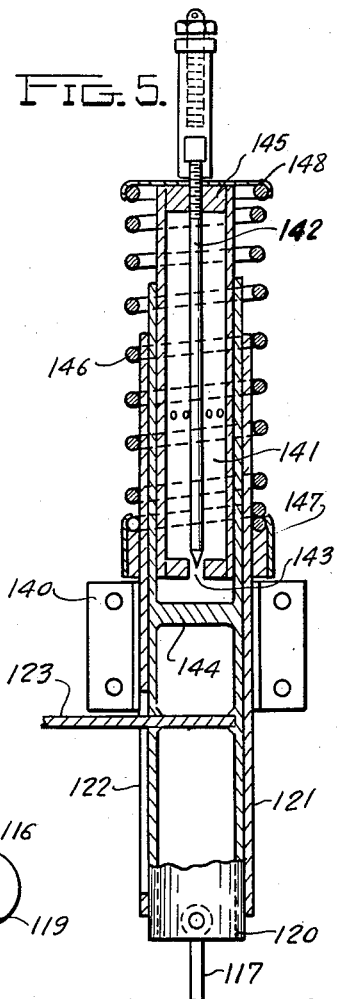
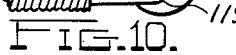
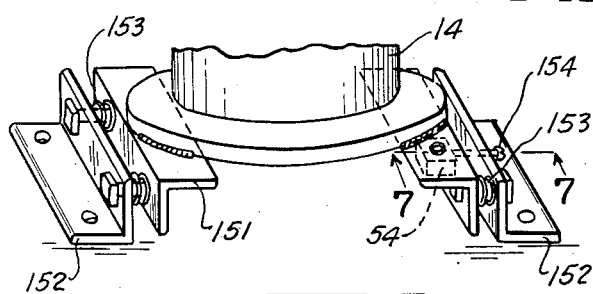
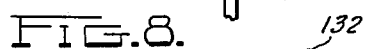
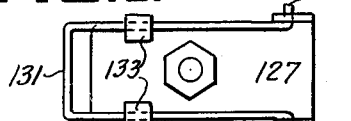
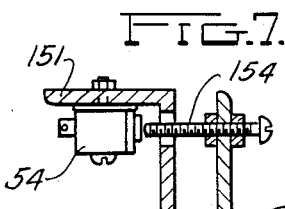
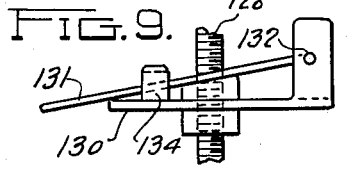
INVENTOR.
Burton P. Baker
BY
Barnes, Kisselle, Laughlin & Raisch
ATTORNEYS Patented Apr. 10, 1951

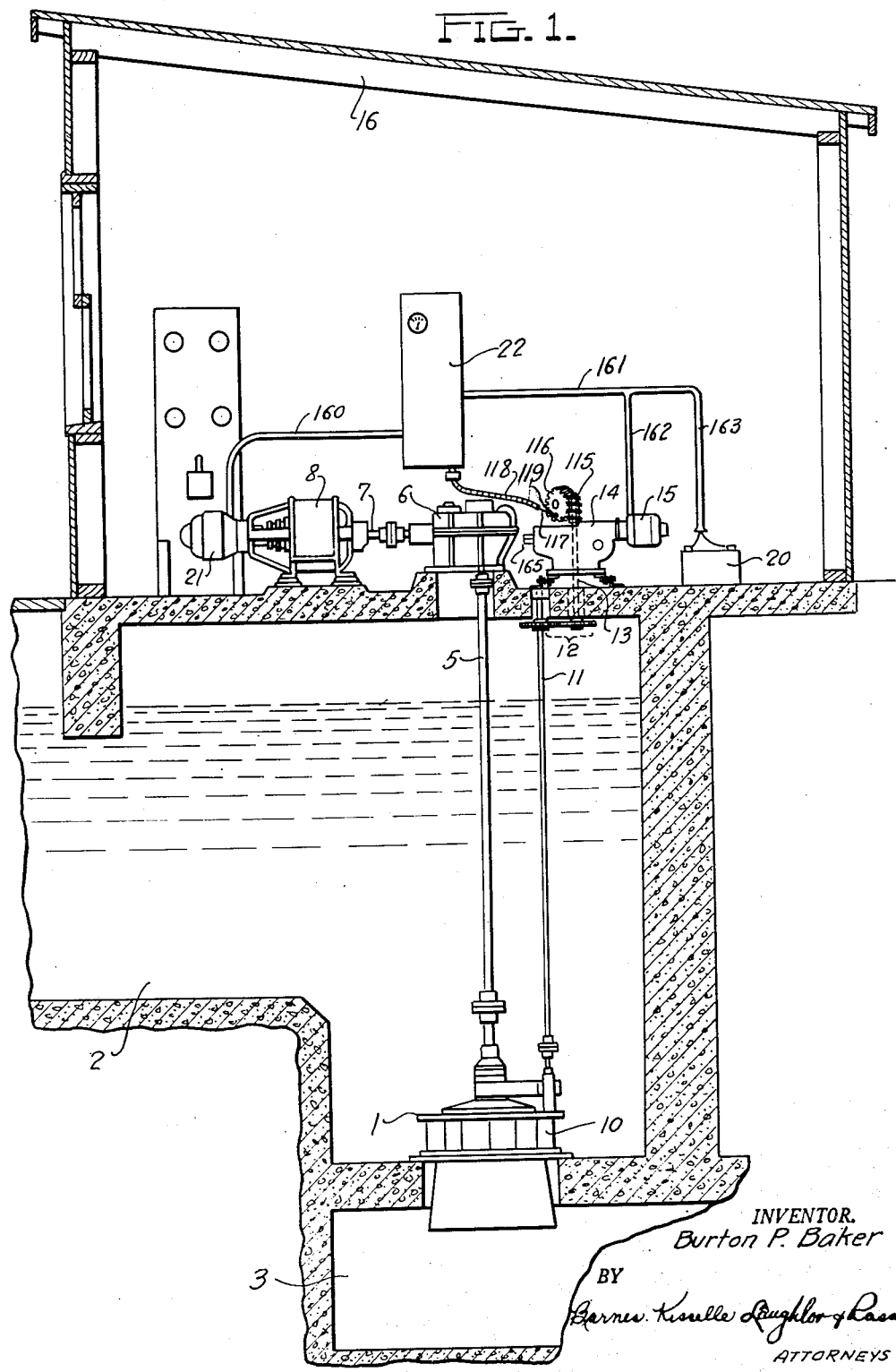

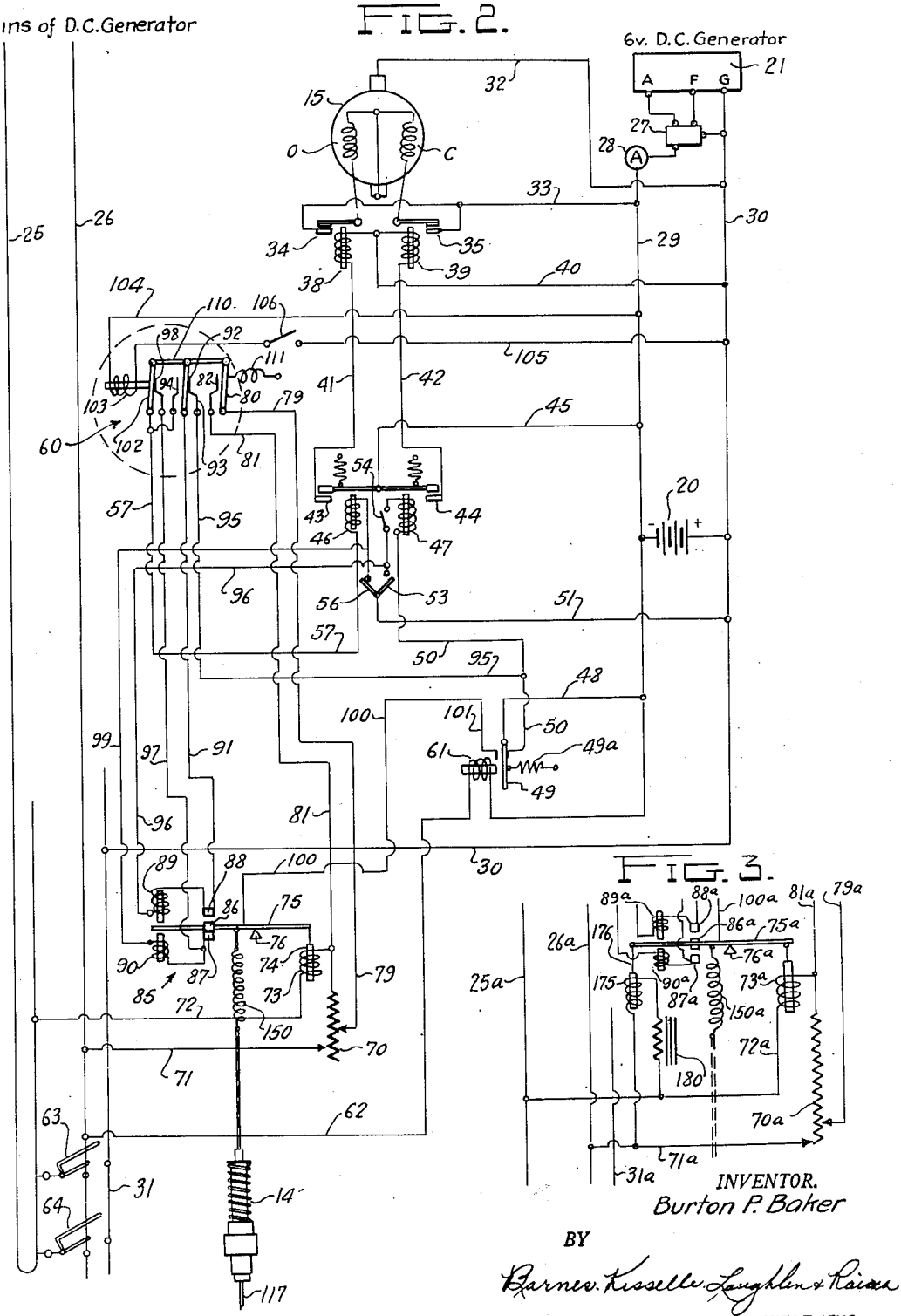

2,548,462

UNITED STATES PATENT OFFICE 2,548,462

PLANT CONTROL FOR HYDROELECTRIC GENERATORS

Burton P. Baker, Detroit, Mich.

Application June 12, 1946, Serial No. 676,179

8 Claims. (Cl. 290—30)

This invention relates to hydroelectric plants and it has to do particularly with the control of the operation of such plants.

More particularly, the invention is directed to the provision of control apparatus for automatically governing the operation incident to load requirements. The automatic control provides for automatic starting in that if the plant is not operating and a load is placed upon the system, the control gates are opened and the plant set into operation. Likewise, when all load is relieved operation of the plant will discontinue by the closing of the gates for the water driven element. In similar manner, the hydroelectric plant is governed during operation by load changes in that increased or decreased load on the generator automatically effects a control of the gates for the water wheel or turbine. These are the principal objects of the invention and others, including overload protection for the gate closing, and emergency shut down will become apparent as the following disclosure is considered in conjunction with the accompanying drawings. In these drawings one control system is shown for carrying out the invention.

Fig. 1 is a general view largely in cross section representative of a hydroelectric plant and illustrating the control system therefor as generally applied thereto.

Fig. 2 is a diagrammatic illustration of the electrical control system.

Fig. 3 is a view of a modification in the control circuits for a system which generates alternating current.

Fig. 4 is a general view of the control panel and represents structure indicated diagrammatically in Fig. 2.

Fig. 5 is a sectional view of a dash pot arrangement for exerting a controlling action on the operation of the water wheel gates.

Fig. 6 is a detailed view showing a mounting for the operating mechanism which provides an overload control.

Fig. 7 is a detail view partly in section taken on line 7—7 of Fig. 6.

Fig. 8 is a plan view of one of the switch operating parts.

Fig. 9 is a side elevational view of the structure shown in Fig. 8.

Fig. 10 is a detail view showing the mechanical mounting of a control element.

As will be seen by reference to Fig. 1, the hydroelectric plant is shown as comprising a water wheel in the form of a turbine 1 appropriately positioned in a well to which water is fed through a forebay or flue 2, the discharge pit being illustrated at 3. The turbine shaft is illustrated at 5 and which extends upwardly into a suitable transmission 6 from which extends a shaft 7 for driving the main generator of a hydroelectric plant as shown at 8.

The turbine is provided with gates 10 for the control of the flow of water therethrough. For convenience the plural term "gates" is used but this is not to be considered as a limiting term. No detail structure is or need be illustrated as any variety of gate structure may be used. Suffice it to say, that the gates, in the usual manner, may be opened and closed by a control shaft 11 operable through gears 12 from shaft 13 of a gear box or speed reducer 14. In other words, the gates 10 are movably mounted and may be pivoted and they are actuated by the control rod 11 so that they are opened and closed and so that the extent of the opening may be controlled to thus control the amount of water flowing through the turbine from the forebay 2 to the discharge pit. For driving the control there is an electric motor 15. This is a reversible motor and when it operates in one direction the gates are opened and when it is operated in the reverse direction the gates are closed. The mechanism may be suitably housed as shown at 16. The control system includes a battery 20 and a small secondary generator 21 all electrically connected as indicated in the diagram of Fig. 2, while the control box or panel is generally shown at 22. It might be said at this point that the control elements, such as the generator 21, the motor 15, the battery 20 and related parts in their circuit, may be and preferably are for a low voltage system, such as six or eight volts, similar to the system conventionally used in automotive vehicles.

Considering now the wiring diagram as shown in Fig. 2, the main conductors of the generator 8 are illustrated at 25 and 26 and the diagram in Fig. 2 is arranged for direct current.

In the circuit for the low voltage generator 21 there may be the usual voltage regulator and cut out 27 and an ammeter 28. One general conductor for the low voltage circuit is illustrated at 29 and one conductor 30 extends from the low voltage generator and connects to the battery and connects to a control wire 31. This conductor is connected to the reversible motor by a suitable conductor 32. From the other side of the low voltage generator extends a conductor 33 and which is connectable to the field coils of the motor through normally open solenoid controlled switches 34 and 35. For controlling the switches 34 and 35 are solenoids 38 and 39 connected into the control circuit through wire 40 and wires 41 and 42 through normally open switches 43 and 44 to conductor wire 45. A solenoid 47 for operating switch 44 is connected into the control circuit by a line 48, a switch 49 and conductor line 50. The other side of the solenoid is connected into the control circuit by a conductor 51, in which conductor there are disposed two switches. One switch is shown at 53 and the other at 54. A solenoid 46 for operating switch 43 also connects into the control circuit through line 51 and a switch 56, while leading from the opposite side of solenoid 46 is a conductor 57 which extends to a relay generally illustrated at 60.

A main control solenoid 61 for controlling switch 49 is connected to the low voltage conductor 29 and through a conductor 62 to the main direct current conductor 26. Switches 63 and 64 are representative of loads which may be placed across the main conductors 25 and 26 and they each have an arm for making a contact in the line 31 when they are closed. Accordingly, when either one or both of the switches 63 and 64 are closed a circuit is made through the solenoid 61, wire 62, the closed switch, control wire 31 and back through conductor 30.

There is a resistance 70 connected into the main D. C. line by conductors 71 and 72 with the circuit running through a coil 73 provided with a core 74 for operating a balance arm 75 of a balancer relay 85, the arm being fulcrumed as at 76. The resistance 70 is wound with wire of substantially zero temperature coefficient. Connected to the resistance 70 at an intermediate point, which point is variable, is a conductor 79 which extends to the switch arm 80 of the relay 60, the switch 80 being adapted to make a contact with the terminal 82 which is connected by wire 81 to the coil 73.

The balancer relay 85 includes a contact 86 on the balance arm 75 for contacting with contact members 87 and 88. The balance arm 75 is further controlled by solenoids 89 and 90. A circuit for the contact 88 includes a wire 91 which leads to switch arm 92 on the relay 60 operable between two contacts 93 and 94. The contact 93 is connected to a conductor 95 which makes connection with conductor 50. The contact 94 is connected to conductor 57.

The circuit through the coil 89 includes a wire 96 which extends to contact piece 88 and connects to the conductor 51 on one side of the switch 53.

The contact 87 is connected by a wire 97 which connects to contact piece 98 of the relay 60. Also, extending from the contact 87 is a wire 99 which provides the circuit for the coil 90 and wire 99 connects into the line 51 on one side of the switch 56. Extending from the balance arm 75 is a wire 100 and this connects to a contact 101 of the controlling switch 49. The arm 102 of the relay 60 is for contact with the contact piece 98. The coil 103 of the relay 60 is connected across the low voltage lines 29 and 30 by conductors 104 and 105 and in this circuit is a normally open switch 106.

It will be appreciated that the three movable contact arms of the relay 60 are interconnected by a bar 110 and are moved in unison by the solenoid 103 and a retractor spring 111. For convenience, the relay 60 has been termed a relay; the switch 49, a control switch; the unit embodying the balance arm 75 may be termed a balancing unit and the switches 43 and 44 may be considered as starting switches. The counterparts of some of this mechanism are indicated in Fig. 4 where the same reference characters are applied. Fig. 4 shows how the electrical mechanism may appear in the control box 22.

The mechanical means for interassociating the electrical control apparatus with the movement of the turbine gates is shown as comprising a worm 115 operating with the driving shaft 13 and this oscillates a worm gear 116. Connected to the worm gear 116 is a Bowden wire; the reciprocable wire 117 of which is disposed in a protective casing 118. The wire 117 has a journal connection with the gear 116 at 119 and it will be appreciated how the oscillation of the gear reciprocates the wire 117. This Bowden wire extends into the cabinet 22 where it is connected to the movable element 120 of a dash pot arrangement. The movable element 120 is in the form of a cylinder which slides in a guide 121 which is slotted at 122 for the reception of an arm 123 which is connected to the movable element 120. This arm 123 carries a rod 128 which, in turn, carries an actuator 124 for the switch 56, an actuator 125 for the switch 53 and an actuator generally indicated at 127 for the switch 106. The actuator 127, as shown in Figs. 8 and 9, comprises a body piece 130, an actuator arm 131 which may be in the form of a loop as shown in Fig. 8, pivoted at 132 so that it has a certain amount of free pivotal movement from the position at gravity rest, as shown in Fig. 9, to a position where it engages the overlapping ears 133 of tabs or brackets 134.

The dash pot arrangement has the outer guide sleeve 121 held fixed in brackets 140. Within the cylinder 120 is a piston also in the form of a cylinder, as shown at 141, provided with an adjustable needle valve 142 for controlling a bleed port 143. The sleeve 120 has an intermediate head 144. The needle valve is screw threaded in the head 145 of the piston. Exterior of the sleeve is a spring 146, one end of which is held by a retainer 147 and the other end of which is engaged by a retainer 148. The needle valve extends freely through the retainer 148. The retainer 148 is connected to the balance arm 75, through the means of a spring 150, as illustrated in both Figs. 2 and 4.

The driving unit 14, as shown in detail in Fig. 6, is mounted on a sub-frame 151, which is secured and held by main frame members 152 with interposed springs 153. This permits movement of the unit incident to torque in excess of the strength of the springs and this operates the switch 54 which is carried by the sub-frame and which is arranged to engage an adjustable abutment 154 when the unit oscillates incident to torque.

It might be said that no attempt is made to illustrate the wiring in Fig. 1. Suffice it to say that suitable conduits may be used as illustrated at 160, 161, 162 and 163 for housing the conductors extending to and from the low voltage generator, the battery, the driving motor and the cabinet 22. It might further be said that for emergency purposes the shaft of the unit 14 may be projected as at 165 so that the gates may be operated by hand upon the application of a suitable crank to the squared end of the shaft.

In describing the operation of the apparatus, it is probably most expedient to assume that the plant is not operating and the load on the main line, as indicated by the switches 63 and 64, is nil. The relay 60 will be in the position shown as retracted by spring 111; the switch 106 is normally open, the switches 34, 35, 43 and 44 are normally open. Switch 56 is closed while switches 53 or 54 or both are open and the control switch 49 is in the position as shown. Upon the placing of a load on the system as by closing one of the load switches 63 or 64, a circuit is also made in the control wire 31. This closes the circuit from line 30 to control wire 31 to the main conductor 26, back through line 62 through coil 61 to the low voltage line 29. The solenoid 61 is now energized and the control switch 49 is actuated to make a contact for line 101. A circuit is now made through line 48, through the control switch, through contact 101, line 100, to the balance arm 75. At this time, there having been no previous energization of the system, the spring 150 has pulled the balance arm 75 down so that a contact exists between contacts 86 and 87. The circuit continues from contact 87 through line 97 to switch arm 102, line 57 which extends to solenoid 46 and thence through the closed switch 56 and line 51 back to the low voltage conductor 30. Solenoid 46 acts to close switch 43 thus completing a circuit through the solenoid 38 and conductors 40, 41 and 45. Solenoid 38 closes switch 34 and field coil O of the driving motor is energized. The driving motor 15 thus operates the shaft 11 and the gates begin to open and switches 53 or 54 or both close.

The movement of the gates effects movement of the dash pot through the Bowden wire. The sleeve 120 moves upwardly, as Fig. 5 is viewed, extending spring 146 and moving the piston up with displacement of oil through the metered port 143. To prevent overshooting and to prevent hunting, the upward movement causes the arm 131 to close switch 106. This occurs because the system has not yet fully energized coil 73, and the gate must be stopped in partly open position. At this point, the purpose of the pivotal mounting of the actuator 131 may be considered. Under a given load on the system, or even under a zero load, it requires a greater gate opening to start the plant and bring it up to its speed of operation than it does to maintain that speed of operation after the speed has been attained. Therefore, there may be a controlling function tending to close the gate upon the attaining of the operating speed which would result in lowering of the actuator 131, but it is not desired that the switch 106 be again operated. The free movement or pivotal mounting of the actuator 131 prevents the same from closing switch 106 upon gate closing action. The differential or, in other words, the amount of angular movement of the actuator 131 may be adjusted as required. This energizes solenoid 103 and actuates the relay 60 and breaks the circuit through wire 57, which will thus de-energize solenoid 46 and solenoid 38 with the resultant opening of switches 43 and 34 with resultant de-energization of the coil O of the driving motor to stop gate opening.

In the meantime, potential having been developed in the main lines 25 and 26 of the main generator, there is a current through line 71, the resistance 70, coil 73 and line 72. Thus, the coil 73 reacts against the spring 150. Upon the actuation of the relay 60 there is a reversal of function set up for the circuit in contact 88. Actuation of the relay 60 closes the conact beween 80 and 82 and thus shunts out some of the resistance 70 so that coil 73 rocks the balance arm 75 and establishes a contact between the contact 86 and 88. A circuit is now closed from the low voltage line 29 through wire 48, control switch 49, wire 100, contact 88, line 91, arm 92 and contact 94 of the relay 60 and line 57. This again, in the manner as above described, energizes coil 46, the circuit being completed back through line 51 and closed switch 56 to energize coil 38 and start the motor 15 in gate opening direction. Upon restarting the actuator 131 moves past the switch 106 and it opens. This causes a de-energization of the solenoid of the relay 60 and it is shifted back to the position shown. This action breaks the shunt for the resistance 70 by the breaking of the contact between 80 and 82 and restores the balance arm to its initial condition with the contact 86 against 87 by the action of the spring 150.

When the gates open enough to satisfy the load, enough voltage is built up in the main power lines 25 and 26 so that the solenoid 73 actuates balance arm 75 to its intermediate balanced position as indicated. If the load increases, the plant speed and, therefore, the voltage in the main lines 25 and 26 drops very slightly, thus dropping the voltage in coil 73 and letting the balance arm shift to a position for making the contact at 86 and 87. This action through the circuits, already described, energizes the field O (O meaning for opening the gates) of the motor 15 to open the gates a little further. This picks up the speed of the plant and when the increased voltage impressed upon the coil 73 is adequate the balance arm moves back to its neutral position again and the control motor 15 stops. If the load decreases the system will speed up slightly thus impressing an increased voltage on the solenoid 73 and the balance arm 75 is shifted against the spring 150 to make a contact between 86 and 88. This will have the effect of closing the gates and the circuits are as follows: Starting with the low voltage line 29, the circuit extends through wire 48, the control switch 49, line 100, through contacts 86 and 88, wire 91, and arm 92 of the relay 60. Since the relay is acted upon by the spring 111 the contact is made at 93, then extends to wire 95 which connects to wire 50 leading to solenoid 47. The circuit for solenoid 47 continues back through the closed switch 54 and closed switch 53, and line 51 back to the low voltage line 30. Energization of the coil 47 closes the switch 44 and a circuit is made through the line 45, line 42, to solenoid 39 and wire 40, back to the main low voltage 30. Energization of the coil 39 closes switch 35. This energizes the field coil C of the controlling motor 15 through the conductors 32 and 33. The term C is used to mean gate closing. This operates the motor in reverse and starts closing the gates. This slows down the system, lowers the voltage in coil 73 and when a state of equilibrium exists the balance arm moves back to its neutral position thus breaking the controlling circuits just described and the controlling motor again stops.

If all of the load is thrown off, the solenoid 61 is de-energized and the switch arm 49 is retracted by its spring 49a and it makes a contact with the wire 50. This energizes coil 47 through the closed switches 54 and 53 and line 51 which, in turn, closes switch 44 and through lines 45 and 42 energizes coil 39, whose circuit extends through line 40. This closes switch 35 and energizes the gate closing field of the control motor 15. The motor will operate until the downward movement of the actuator 125 opens switch 53. This breaks the circuit for the solenoid 47 and the motor stops. It might be said at this point that switch 53 is the closing limit stop. Also, Switch 56 is the opening limit stop. In other words, when the gates are wide open the actuator 124, as shown in Fig. 4, contacts switch 56 and opens it. The switch 49 may be manipulated by hand to provide an emergency shut down of the plant.

In the event too much torque is placed upon the driving unit 14, as for example, by a piece of wood or the like getting caught in the gates when the gates are closing, the torque placed thereon causes the unit to oscillate due to the springs 153 (Fig. 6) and this moves switch 54 against a stop 154 and opens the same. This, as will be appreciated by reference to Fig. 2, opens the circuit for the solenoid 46. Thus, the system is protected. In this regard, the torque control or safety switch 54 can be employed for the closing of the gates tightly with the resultant elimination of the closing limit switch 53.

In conjunction with the balance arm 75, are two holding coils 89 and 90. When the arm 75 is shifted to make a contact between contacts 86 and 88, it will be seen that a circuit through the holding coil 89 is completed through the wire 96 which leads back to the line 51. This maintains the contact and prevents chattering of the balance arm 75. Likewise, when the contact is made with the lower contact 87, coil 90 is energized through the line 99 which likewise leads back to the wire 51.

So, it will be seen, that a variation in the voltage in the main lines of the power circuit varies the action of the solenoid 73 which effects oscillation of the balance arm to cause an opening or closing of the turbine gates as required; that the limit switches 53 and 56 take care of maximum opening and of full closing of the gates and the torque controlled safety switch 54 protects the mechanism. Also, an important feature is the reversal of function of the balance arm. Normally, the lower contact 87, when contacted by the contact 86, effects a motor operation in a direction for opening the gates and the contact 88 is normally connected to effect a motor operation for closing the gates. However, to briefly reiterate the above description, upon initial starting and incident to operation of the relay 60, the upper contact 88 is circuited for a second restart of the motor in gate opening direction. In other words, the contact is made with 87 initially and the motor operates in a direction to open the gates. This is stopped by the closing of the switch 106. Then the balance arm moves to close the circuit with 88 to restart the motor in gate opening direction. This action prevents overshooting the gate opening action too far.

The dash pot arrangement is employed to prevent hunting of the system. It provides a delayed action. When the movement caused by the Bowden wire results in an upward movement of the cylinder 120, it shifts the piston 141 upwardly and lessens the tension on the spring 150. This also extends the spring 146. This action is accompanied by some bleeding of the liquid through the port 143 with the liquid flowing into the cylinder. After the cylinder 120 has moved to a given position, because the controlling motor 15 stops, the spring 146 will pull the spring retainer 148 downwardly with a delayed action because of the bleeding of the liquid from the cylinder 120 into the piston. Ultimately, the spring 146 will bring the retainer 148 back to a neutral position. In the reverse action, with downward movement of the cylinder 120, the spring 146 is compressed, thus to increase the tension of spring 150 on the balance arm. Following this, the spring 146 extends with a slowed delayed action because of the bleed port 143. Assume that the load on the plant increases resulting in deceleration of the plant and a drop of voltage in the coil 73; the spring 150 rocks the balance arm, makes a contact with 87 thus starting the motor operating for the opening of the gates. This actuation of the motor, through the Bowden wire, shifts the cylinder 120 upwardly as Fig. 5 is viewed, thus decreasing the tension of the spring 150. This restores a state of equilibrium between the spring 150 and coil 73 and stops the gate opening motion. Now, the bleed port 143 is adjusted so that the delayed movement in increasing the tension of the spring 150 is substantially synchronized with the increasing voltage in the coil 73 so that when once again the plant output is adequate for the increased load a balanced condition may be maintained and the balance arm 75 continues in neutral position. The same operation, but in reverse may take place when the load decreases resulting in an increased voltage in the coil 73 and a contact at 88. Operation of the control motor shifts the cylinder 120 downwardly thus increasing the tension of spring 150. The gates are now closing and the voltage impressed upon the coil 73 is decreasing at substantially the same rate as the delayed decrease of tension of spring 150 by the upward movement of the piston 141. This prevents hunting in the system by damping the oscillation of the balance arm 75.

A partial diagram is shown in Fig. 3 showing a balance arm arrangement which is sensitive to frequency and therefore adequate for operation where alternating current is generated. Like parts are identified by like characters with the addition of the letter "a" so that an entirely new description is not necessary. In this form a coil 175 has a core 176 acting upon the balance arm 75a and this coil, as shown, is connected across the wire 72a and 71a and therefore is in parallel with coil 73a. There is a reactance 180 in series with coil 175. This reactance in the circuit for the coil 175 makes the combined circuits of the two coils sensitive to change in frequency. In other words, the two coils may be normally balanced but upon acceleration or deceleration there is a change in frequency in the alternating current which results in an unbalanced condition for the actuation of the balance arm 75a in one direction or the other as the case requires.

I claim:

1. A control system for a hydroelectric plant having a water wheel, a main generator driven thereby, conductors for the current generated by the main generator across which loads are adapted to be placed, a gate for controlling the supply of water to the wheel, and operating means for the gate; a low voltage system including a generator operable by the wheel, a reversible motor for driving the gate operating means, a low voltage control circuit, a control switch in the circuit, and a solenoid in the control circuit, switch means closable upon the placing of a load across the conductors for the current generated by the main generator for energizing the said solenoid for closing the control switch to operate the low voltage motor in a direction for opening the gate.

2. A control system for a hydroelectric plant having a water wheel, a main generator driven thereby, conductors for the current generated by the main generator across which loads are adapted to be placed, a gate for controlling the supply of water to the wheel, and operating means for the gate; a low voltage system including, a low voltage generator operable by the wheel, a reversible motor for driving the gate operating means, a circuit therefor, a control switch in the circuit normally closed during the operating of the plant serving as primary means for closing the circuit for the low voltage motor, a balance arm serving as a secondary means for controlling the circuit to the low voltage motor, and solenoid means acting upon the balance arm and sensitive to current variations in the conductors for the current from the main generator for operating the balance arm incident to change of condition in the current from the main generator, whereby a variation in load conditions on the main generator affects the solenoid to shift the balance arm and operate the low voltage motor in the required direction for operating the gate operating means.

3. A control system for a hydroelectric plant having a water wheel, a main generator driven thereby, conductors for the current generated by the main generator across which loads are adapted to be placed, a gate for controlling the supply of water to the wheel, and operating means for the gate; a low voltage system and circuit therefor including a low voltage generator operated by the wheel, a low voltage motor for operating the gate operating means, two circuits for the low voltage motor for energizing the same for operation in opposite directions, one for opening the gate and one for closing the gate, a balance arm shiftable in one direction to close one of the two circuits and shiftable in another direction to close the other of the two circuits, a solenoid operable upon the balance arm to shift the same, a circuit for the solenoid connected into the conductors for the main generator, said solenoid being sensitive to current variations whereby upon a reduced speed of the generator incident to an increased load, the balance arm is operated to close the circuit for the low voltage motor to operate the same in a direction for opening the gate, and upon an increase of speed in the main generator to close the other circuit to operate the low voltage motor in the opposite direction for closing the gate, a dash pot structure yieldably connected to the balance arm and means mechanically connecting the operating means for the gate with the dash pot.

4. A control system for a hydroelectric plant having a water wheel, a main generator driven thereby, conductors for the current generated by the main generator across which loads are adapted to be placed, a gate for controlling the supply of water to the wheel, and operating means for the gate; a low voltage system and circuit therefor including a low voltage generator operated by the wheel, a low voltage motor for operating the gate operating means, two circuits for the low voltage motor for energizing the same for operation in opposite directions, one for opening the gate and one for closing the gate, a balance arm shiftable in one direction to close one of the two circuits and shiftable in another direction to close the other of the two circuits, a solenoid operable upon the balance arm to shift the same, a circuit for the solenoid connected into the conductors for the main generator, said solenoid being sensitive to current variations whereby upon a reduced speed of the generator incident to an increased load, the balance arm is operated to close the circuit for the low voltage motor to operate the same in a direction for opening the gate, and upon an increase of speed in the main generator to close the other circuit to operate the low voltage motor in the opposite direction for closing the gate, a dash pot structure yieldably connected to the balance arm and means mechanically connecting the operating means for the gate with the dash pot, said dash pot having a bleed orifice for liquid and the bleeding of the liquid being timed so that its action on the balance arm is substantially synchronized with the changing current conditions in the solenoid.

5. A control system for a hydroelectric plant having a water wheel, a main generator driven thereby, conductors for the current generated by the main generator across which loads are adapted to be placed, a gate for controlling the supply of water to the wheel, and operating means for the gate; a low voltage system including a generator operable by the wheel, a reversible low voltage motor for driving the gate operating means, a primary control switch in the low voltage circuit arranged to be automatically closed upon the placing of a load on the main generator, a low voltage circuit for energizing the low voltage motor for operation in a direction to open the gates, another low voltage circuit for energizing the low voltage motor for operation in the opposite direction for closing the gates, a balance arm operable to automatically and selectively close said two circuits, a solenoid and a dash pot arrangement, both operable upon the balance arm, said solenoid being connected in a circuit across the conductors from the main generator whereby the same is sensitive to current variations, the dash pot arrangement being mechanically connected to the gate operating means and sensitive to movements thereof.

6. A control system for a hydroelectric plant having a water wheel, a main generator driven thereby, conductors for the current generated by the main generator across which loads are adapted to be placed, a gate for controlling the supply of water to the wheel, and operating means for the gate; a low voltage system including a generator operable by the wheel, a reversible low voltage motor for driving the gate operating means, a primary control switch in the low voltage circuit arranged to be automatically closed upon the placing of a load on the main generator, a low voltage circuit for energizing the low voltage motor for operation in a direction to open the gates, another low voltage circuit for energizing the low voltage motor for operation in the opposite direction for closing the gates, a balance arm operable to automatically and selectively close said two circuits, a solenoid and a dash pot arrangement, both operable upon the balance arm, said solenoid being connected in a circuit across the conductors from the main generator whereby the same is sensitive to current variations, the dash pot arrangement being mechanically connected to the gate operating means and sensitive to movements thereof, and a relay operable by movement of the gate operating means for reversing the condition of the circuit for energizing the motor for operation in a gate closing direction so that said circuit energizes the motor for operation in a gate opening direction.

7. A control system for a hydroelectric plant having a water wheel, a main generator driven thereby, conductors for the current generated by the main generator across which loads are adapted to be placed, a gate for controlling the supply of water to the wheel, and operating means for the gate; a low voltage system including a generator operable by the wheel, a reversible motor for driving the gate operating means, a low voltage circuit, an independent source of electromotive force in said circuit, a control switch in the circuit, a solenoid in the control circuit, switch means closable upon the placing of a load across the conductors for the current generated by the main generator for the energizing of said solenoid by said independent source for closing the control switch to operate the low voltage motor in a direction for opening the gate, and a third circuit closed by the control switch when all load is removed from the main generator conductors for energizing the low voltage motor for operation in gate closing direction.

8. A control system for a hydroelectric plant having a water wheel, a main generator driven thereby, conductors for the current generated by the main generator across which loads are adapted to be placed, a gate for controlling the supply of water to the wheel, and operating means for the gate; a low voltage system including a generator operable by the wheel, a reversible motor for driving the gate operating means, a low voltage control circuit, a control switch in the circuit, a solenoid in the control circuit energized upon the placing of a load across the conductors for the current generated by the main generator for closing the control switch to operate the low voltage motor in a direction for opening the gate, a third circuit closed by the control switch when all load is removed from the main generator conductors for energizing the low voltage motor for operation in gate closing direction, and a torque actuated safety switch operable to break the circuit for the low voltage motor when excessive resistance is encountered in the closing of the gates.

BURTON P. BAKER.

REFERENCES CITED

The following references are of record in the file of this patent:

UNITED STATES PATENTS

| Number | Name | Date |
| --- | --- | --- |
| 1,505,853 | Brainard | Aug. 19, 1924 |
| 1,521,004 | Bradshaw et al. | Dec. 30, 1924 |
| 1,612,351 | Boddie | Dec. 28, 1926 |
| 1,713,156 | Winter | May 14, 1929 |
| 1,829,427 | Wensley | Oct. 27, 1931 |
| 1,836,861 | Moody | Dec. 15, 1931 |
| 1,844,719 | Stivender | Feb. 9, 1932 |
| 1,844,720 | Stivender | Feb. 9, 1932 |
| 1,859,839 | Nye | May 24, 1932 |
| 1,863,302 | Geiselman | June 14, 1932 |
| 1,948,591 | Morgan | Feb. 27, 1934 |
| 1,977,333 | Wunsche | Oct. 16, 1934 |
| 2,015,555 | Fountain | Sept. 24, 1935 |
| 2,262,560 | Bryant | Nov. 11, 1941 |
| 2,285,208 | Johntz et al. | June 2, 1942 |
| 2,315,490 | Alexanderson | Apr. 6, 1943 |
| 2,315,491 | Alexanderson | Apr. 6, 1943 |
| 2,417,581 | Aldred | Mar. 18, 1947 |
| 2,420,312 | Grabau | May 13, 1947 |